Figure 1:
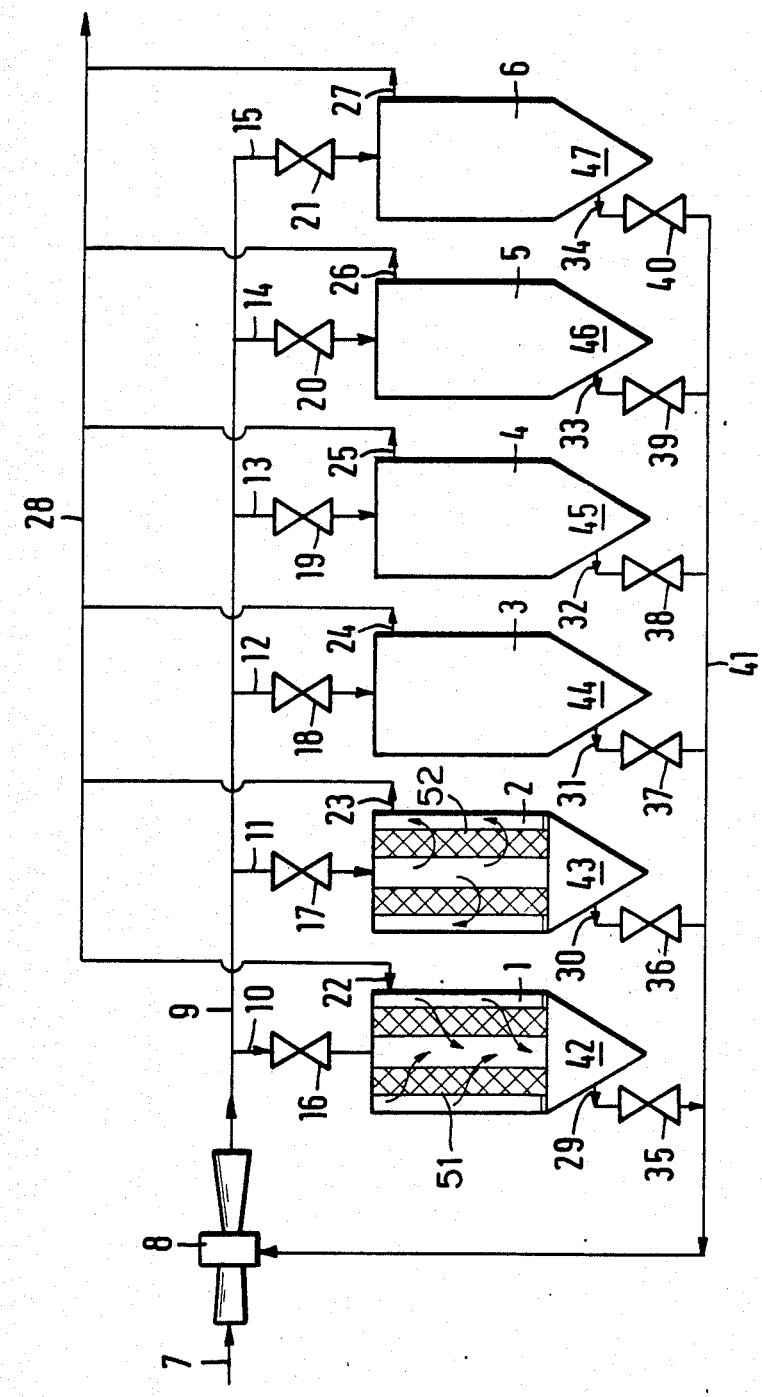

United States Patent [19]
Roos

[11] Patent Number: 4,692,173
[45] Date of Patent: Sep. 8, 1987

[54] PROCESS FOR CLEANING FILTER ELEMENTS

[75] Inventor: Hans Roos, Meerbusch, Fed. Rep. of Germany

[73] Assignee: Deutsche Filterbau GmbH, Dusseldorf, Fed. Rep. of Germany

[21] Appl. No.: 829,481

[22] Filed: Feb. 14, 1986

[30] Foreign Application Priority Data

Feb. 15, 1985 [DE] Fed. Rep. of Germany ....... 3505729

[51] Int. Cl.⁴ .............................................. B01D 46/04
[52] U.S. Cl. ......................................... 55/96; 55/302; 55/284
[58] Field of Search ..................... 55/96, 97, 283, 302, 55/303, 284, 338

[56] References Cited

U.S. PATENT DOCUMENTS

| | | | |
|---|---|---|---|
| 3,057,137 | 10/1962 | Perlis et al. | 55/303 |
| 3,146,080 | 8/1964 | Ruble et al. | 55/302 |
| 3,473,300 | 10/1969 | Wilm et al. | 55/302 |
| 3,897,228 | 7/1975 | Berz | 55/338 |
| 3,964,883 | 6/1976 | Nakao | 55/338 |
| 4,507,130 | 3/1985 | Roth | 55/284 |

FOREIGN PATENT DOCUMENTS 925392 3/1955 Fed. Rep. of Germany ........ 55/302

Primary Examiner—Bernard Nozick

[57] ABSTRACT

A process is described for cleaning in each case part of a plurality of filter elements arranged in a filter chamber (1 to 6), which are used for removing the dust from a pressurized dust-laden gas using scavenging gas supplied in the opposite direction to the normal flow direction. The scavenging gas flows from the clean gas side through the filter elements from which the collected dust is to be removed. The scavenging gas is branched from the pressurized clean gas flow removed from the filter elements not subject to the cleaning process. The scavenging gas from the particular filter chamber is supplied to the dust-laden gas side. The mixing of the scavenging gas with the dust-laden gas takes place with the aid of a compressed gas jet pump (8), which also exerts a suction action on the scavenging gas.

1 Claim, 2 Drawing Figures

PROCESS FOR CLEANING FILTER ELEMENTS

The invention relates to a process for cleaning in each case part of a plurality of filter elements arranged in a filter chamber for the separation of particulate substances from a pressurized dust-laden gas with a scavenging gas, which flows under pressure from the clean gas side through the filter elements from which the collected dust is to be cleaned.

Filters used for cleaning dust-laden gases must be cleaned at regular intervals, so their function is not excessively impaired by the dust deposited on the filter surfaces. Such a cleaning of the filter surfaces e.g. takes place with the aid of back-scavenging of cleaned gases. It is known to carry out the back-suction of cleaned gases through the filter surfaces using fans. These known back-scavenging systems with fans suffer from serious disadvantages, which are particularly apparent when removing dust from high temperature gases. External energy must be used for operating the fans for producing the necessary vacuum and also the fans constitute moving and mechanically very highly stressed parts, which can only be used up to certain temperature and pressure values for the gases.

DE-OS 27 26 735 discloses an apparatus for cleaning filter elements arranged in a filter chamber, in which blast air from the clean gas side is passed through the filter surfaces by air scavenging or compressed air shock. Particularly in the case of hot gas filters, where rubbery sealing elements cannot be used, it is proposed for the known apparatus to use lifting cylinders, whose piston rods are connected to the blast air distribution pipe, to keep the sealing discs placed on the filter elements for cleaning purposes sufficiently far from the outlet of the filter elements during the normal filtering process that said sealing discs do not form a closure for the filter elements. Although no fans are used here for producing the back-scavenging gas flow, an additional blast air system is required.

DE-OS No. 20 53 692 discloses a process for cleaning filter surfaces, in which pressure surge back-scavenging takes place by means of scavenging air jets, which are blown in the counter current direction through the clean gas outflow connections of the filter elements which during normal filter operation are subject to action from the outside to the inside. During the scavenging process, the clean gas outflow connections are closed with respect to the clean air zone by a mechanical closing member. The scavenging process takes place at the same time, but only on one or a part of the filter elements, so that the clean air flow is not interrupted. However, hereagain an independent compressed air system is required for the scavenging process.

It is therefore the problem of the present invention to improve the known process for cleaning part of a plurality of filter elements arranged in a filter chamber for the separation of particulate substances from a pressurized dust-laden gas with a scavenging gas which, under pressure and from the clean gas side, flows through the filter elements from which the collected dust is to be removed. The improved process must be such that there is no need for an independent compressed air system for the scavenging and that also no moving parts or dissimilar energy are required.

According to the invention, this problem is solved by branching the scavenging gas from the pressurized clean gas flow removed from the filter elements not undergoing the cleaning process.

The inventive solution consists of the scavenging gas being branched from the pressurized clean gas flow from the particular filter elements not undergoing the cleaning process. In order to avoid a gas loss and prevent any contamination of the environment by the gas, the scavenging gas discharged from the filter chambers is preferably admixed again with the dust-laden gas to be cleaned. The process is advantageously performed in such a way that the outlets of the filter chambers are linked and that the inlets for the pressurized dust-laden gas to be cleaned of the filter chambers associated with the filter elements to be cleaned are closed and simultaneously during the filtering process closed outlets of said filter chambers are opened for the discharge of the scavenging gas. The admixing of the scavenging gas discharged from the filter chambers with the dust-laden gas to be filtered can take place with the aid of a compressed gas jet pump, so that no moving parts are required for this process.

The invention is described in greater detail hereinafter relative to an embodiment and the attached drawings, wherein show:

FIG. 1 a diagrammatic view of a high pressure hot gas dust removal plant with back-scavenging cleaning.

Figure 2:
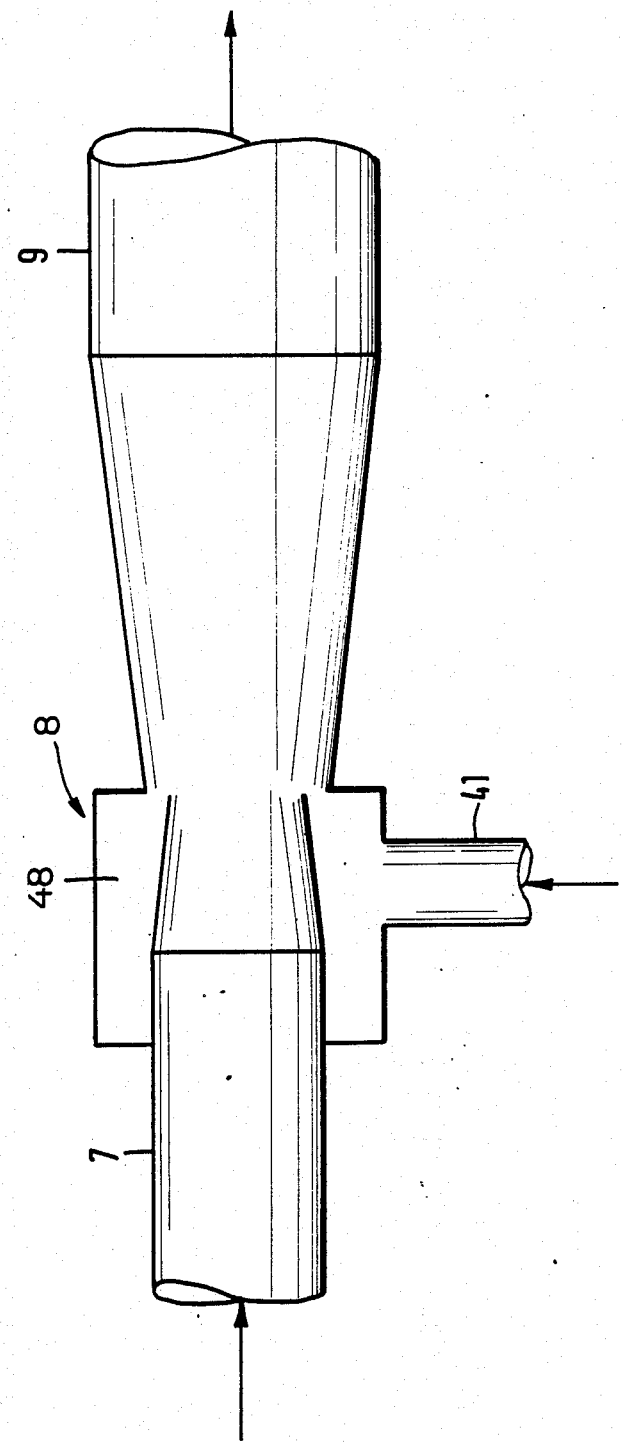

FIG. 2 a diagrammatic view of a compressed gas jet pump for scavenging gas return.

The plant according to FIG. 1 has six filter chambers 1 to 6 containing filter elements only two of which 51,52 are shown. The dust-laden gas from which the dust is to be removed is supplied via a line or pipe 7 and passes via a compressed gas jet pump 8 to a line or pipe 9, from which branches 10 to 15 pass in each case to the dust-laden gas inlet of each of the filter chambers 1 to 6. Each of the branches 10 to 15 contains one of six controllable valves 16 to 21 enabling the closing or opening of the connection between line 9 and the dust-laden gas inlet of the particular associated filter chamber 1 to 6.

Each of the filter chambers 1 to 6 has an outlet 22 to 27 for the filtered clean gas. These outlets are connected the a common clean gas line 28 by means of which the dust-removed clean gas is lead away.

Each of the filter chambers 1 to 6 has an outlet 29 to 34 for the scavenging gas used for filter cleaning. Each of these outlets 29 to 34 is connected by means of one of the controllable valves 35 to 40 to a common scavenging gas pipe or line 41. Each of the valves 35 to 40 can be controlled in such a way that a connection between the associated outlet 29 to 34 and the scavenging gas line 41 is either formed or interrupted. The scavenging gas line 41 is led back to the compressed gas jet pump 8.

FIG. 2 shows the per se known compressed gas jet pump 8 used in FIG. 1. The tapering end of line 7 ends in an annulus 48, with whose jacket are connected in gastight manner the ends of line 9 and the scavenging gas line 41. The dust-laden gas supplied via line 7 flows into line 9 and hereby entrains the scavenging gas introduced via scavenging gas line 41 into annulus 48. Thus, a mixture of the dust-laden gas and the returned scavenging gas is led to the dust-laden gas inlets of filter chambers 1 to 6.

The described plant functions as follows. If dust removal of the dust-laden gas is now carried out, all the valves 16 to 21 are open and all the valves 34 to 40 closed. The pressurized dust-laden gas consequently passes into all the filter chambers 1 to 6, wherein the dust is removed therefrom. It then flows out through outlets 22 to 27 of filter chambers 1 to 6 and is led away by means of clean gas line 28.

In FIG. 1, the flow conditions are indicated by the arrow directions for the case that the filter elements in filter chamber 1 are to be cleaned and that only in filter chambers 2 to 6 is the dust to be removed from the dust-laden gas. Valve 16 is closed and valve 35 open. Thus, branch 10 is interrupted so that no dust-laden gas is supplied to filter chamber 1. Instead, the pressurized clean gas in clean gas line 28 is passed via outlet 22 into the filter chamber, where it flows through the filter elements in the opposite direction and is led of via outlet 29 and open valve 35 to the scavenging gas line 41. The dust deposited on the filter elements is removed and drops into silos 42 to 47.

Thus, the scavenging gas returned to the compressed gas jet pump 8 is substantially dust-free. Thus, the compressed gas jet pump 8 exercises a suction action on the scavenging gas, which flows at high speed through the filter elements giving a significant cleaning action. Following the cleaning of the filter elements in filter chamber 1, valve 16 is again opened and valve 35 again closed, so that said filter chamber is again made available for normal dust removal. At regular intervals, this cleaning process is then successively performed in filter chambers 2 to 6. Thus, the cleaning of the filter elements can be carried out without the clean gas flow being interrupted and without moving parts being arranged in the gas flow. In addition, no external energy and no separate compressed air system are required for producing the scavenging gas flow.

I claim:

1. A method of cleaning filter elements in at least one of a plurality of filter chambers, in which each filter element has a dust-collecting side and a clean side, and each filter chamber has a closable connection from a conduit carrying pressurized dust-laden gas to the dust-collecting side of the respective filter element and also has a connection between a conduit carrying pressurized clean gas and the clean side of the respective filter element, and a closable outlet to a conduit for dust-laden scavenging gas; said method comprising the steps of: closing the connection between the conduit carrying the pressurized dust-laden gas and said at least one filter chamber, opening the connection to the dust-laden scavenging gas conduit of said at least one filter chamber; passing clean gas as a scavenging gas from the conduit carrying clean gas to the clean side of the filter element in said at least one filter chamber to thereby remove dust collected on the dust-collecting side of said at least one filter element, and adding the scavenging gas from said at least one filter chamber to the conduit carrying the pressurized dust-laden gas via a compressed air jet pump.

* * * * *